(12) United States Patent
Kinstler

(10) Patent No.: US 7,114,684 B2
(45) Date of Patent: Oct. 3, 2006

(54) METHOD, APPARATUS, AND COMPUTER PROGRAM PRODUCT FOR SAFE EXIT MANEUVER FROM DIMENSIONALLY EXTENDED ROTATING SPACE VEHICLE

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 10/802,021

(22) Filed: Mar. 16, 2004

(65) Prior Publication Data
US 2005/0224661 A1 Oct. 13, 2005

(51) Int. Cl.
B64G 1/64 (2006.01)

(52) U.S. Cl. .................................... 244/173.3

(58) Field of Classification Search ................ 244/159, 244/161, 172.4, 171.4, 172.1, 173.3
See application file for complete search history.

(56) References Cited

U.S. PATENT DOCUMENTS 3,744,739 A * 7/1973 Weaver et al. .............. 244/161
5,064,151 A 11/1991 Cerimele et al.
5,158,248 A 10/1992 Mockovciak, Jr.
5,305,970 A * 4/1994 Porter et al. ................ 244/159

OTHER PUBLICATIONS http://www.spaceflightnow.com/proton/dtv5/.*
http://www.nationmaster.com/encyclopedia/Manned-Maneuvering-Unit.*

* cited by examiner

*Primary Examiner*—Peter M. Poon
*Assistant Examiner*—Timothy D. Collins
(74) *Attorney, Agent, or Firm*—Alston & Bird LLP

(57) ABSTRACT

There is provided methods, apparatus, and computer program products for implementing a KINSTLER maneuver for an exit vehicle that is departing from a rotating space vehicle such that the exit vehicle does not contact the space vehicle during departure. A composite spin axis of the space vehicle is determined, which defines a plurality of spin axis planes that contain the exit vehicle along the exit flight path. The spin rate of the rotating space vehicle is determined about the composite spin axis, and the exit vehicle is launched from the space vehicle, providing the exit vehicle with a departure velocity having a $V_S$ component. Lateral thrust is applied to provide a lateral acceleration, which provides a turn rate of the exit vehicle's $V_S$ component in the spin axis plane about the composite spin axis that is proportionate to the spin rate of the rotating space vehicle.

8 Claims, 5 Drawing Sheets

METHOD, APPARATUS, AND COMPUTER PROGRAM PRODUCT FOR SAFE EXIT MANEUVER FROM DIMENSIONALLY EXTENDED ROTATING SPACE VEHICLE

FEDERALLY SPONSORED RESEARCH OR DEVELOPMENT

This invention was made with government support under Contract No. NAS8-01099 awarded by the National Aeronautics and Space Administration. The government may have certain rights in this invention.

BACKGROUND OF THE INVENTION

1. Field of the Invention

The present invention is related to space station exit vehicles, and more particularly, to maneuvering an exit vehicle that is departing from a rotating space vehicle so that the exit vehicle is prevented from contacting the rotating space vehicle.

2. Description of Related Art

Dimensionally extended space vehicles, such as space stations, occupied by humans are becoming increasingly common during the present age of space exploration. Space stations, such as the International Space Station (ISS), provide living areas and work areas, such as laboratories, for use by the people temporarily residing in the space station. Such crews of individuals often stay on the space station for months at a time as they perform experimental tests, collect astronomical data, and coordinate other activities. These space stations often include exit vehicles, or crew return vehicles, that may be used by the crew during emergencies to depart the space station to rendezvous with another space craft or to return safely to earth.

Space stations such as the ISS typically have a stationary, or static, orientation during normal operation of the space station. Under such conditions, an exit vehicle may safely depart from the space station without being contacted by the space station. However, an emergency situation may arise wherein the space station is rotating about one or more axes. Emergencies that may cause the space station to spin may include an impact by one or more foreign objects, venting of pressurized gases due to pressure vessel rupture or puncture, or failure of control mechanisms of the space station. This rotating of the space station complicates the departure of the exit vehicle because the rotating space station could possibly contact the exit vehicle during departure. Such contact could damage the exit vehicle and/or the space station and threaten the lives of the crew in the exit vehicle. Therefore, a need exists for a safe and reliable method of maneuvering the exit vehicle from a rotating space station so that the exit vehicle does not contact the space station.

In addition, exit vehicles contain only a limited amount of propellant such as rocket fuel, which is primarily reserved for movement of the exit vehicle subsequent to departure from the space station. Such movement of the space station may include a rendezvous with another spacecraft or reentry of the exit vehicle into the earth's atmosphere. Devices such as the orbital maneuvering system (OMS) thrusters or the reaction control system (RCS) thrusters require propellant to move and orient the exit vehicle. The OMS thrusters provide relatively large amounts of thrust for large movements of the exit vehicle, while the RCS thrusters provide smaller thrust for finer movement of the exit vehicle. Both sets of thrusters enable precise maneuvering of the exit vehicle and are supplied by the limited amount of propellant. Therefore, the method of maneuvering the exit vehicle safely away from the rotating space station would preferably use a small amount of propellant during departure so that propellant is preserved for reentry or other maneuvering of the exit vehicle subsequent to departure from the space station. Similar needs exist for alternative space vehicles that comprise exit vehicles for the crew.

Therefore, a need exists for a method of maneuvering an exit vehicle from a rotating space vehicle so that the exit vehicle does not contact the space vehicle. Such a maneuver would advantageously preserve propellant for subsequent maneuvering of the exit vehicle.

BRIEF SUMMARY OF THE INVENTION

Methods, apparatus, and computer program products are provided according to the present invention for maneuvering an exit vehicle that is departing from a rotating space vehicle. By implementing the KINSTLER maneuver in accordance with various embodiments of the present invention, the exit vehicle can safely depart a rotating space vehicle while preserving propellant for subsequent maneuvers. According to the present invention, a composite spin axis of the space vehicle is determined, such as by a processing circuitry, to define a plurality of spin axis planes that are perpendicular to the composite spin axis. In this regard, the composite spin axis may be determined by determining the root-sum-square of the angular velocities of the space vehicle about all three space vehicle axes. The exit flight path of the exit vehicle is defined in the plurality of spin axis planes, such as by the processing circuitry. A spin rate of the rotating space vehicle about the composite spin axis is also determined, typically by the circuitry.

The exit vehicle is then launched from the space vehicle, such as by a launch mechanism, which provides a departure velocity in the spin axis plane. The departure velocity includes a $V_S$ component that is defined in the plurality of spin axis planes. The departure velocity may be constant or may increase along the exit flight path. Advantageously, the exit vehicle may be launched so as to have a linear exit trajectory in space vehicle coordinates in the direction of the departure velocity.

To effect a safe exit, it is necessary to control the $V_S$ component of the exit vehicle to provide a turn rate of the exit vehicle $V_S$ component. Lateral thrust is thus applied to the exit vehicle, such as by a thrust device, to provide a lateral acceleration, wherein the lateral acceleration is defined to be in the spin axis plane. The lateral acceleration provides a turn rate of the exit vehicle $V_S$ component in the spin axis plane about the composite spin axis. The turn rate is proportionate to the spin rate of the rotating space vehicle such that the exit vehicle does not contact the rotating space vehicle during the exit flight path. The turn rate of the exit vehicle of alternative embodiments of the present invention may be less than, greater than, or equal to the spin rate of the rotating space vehicle. The present invention, therefore, safely and reliably maneuvers the exit vehicle during its departure from the rotating space vehicle and preserves propellant for subsequent maneuvering of the exit vehicle.

BRIEF DESCRIPTION OF THE SEVERAL VIEWS OF THE DRAWINGS

Figure 1:
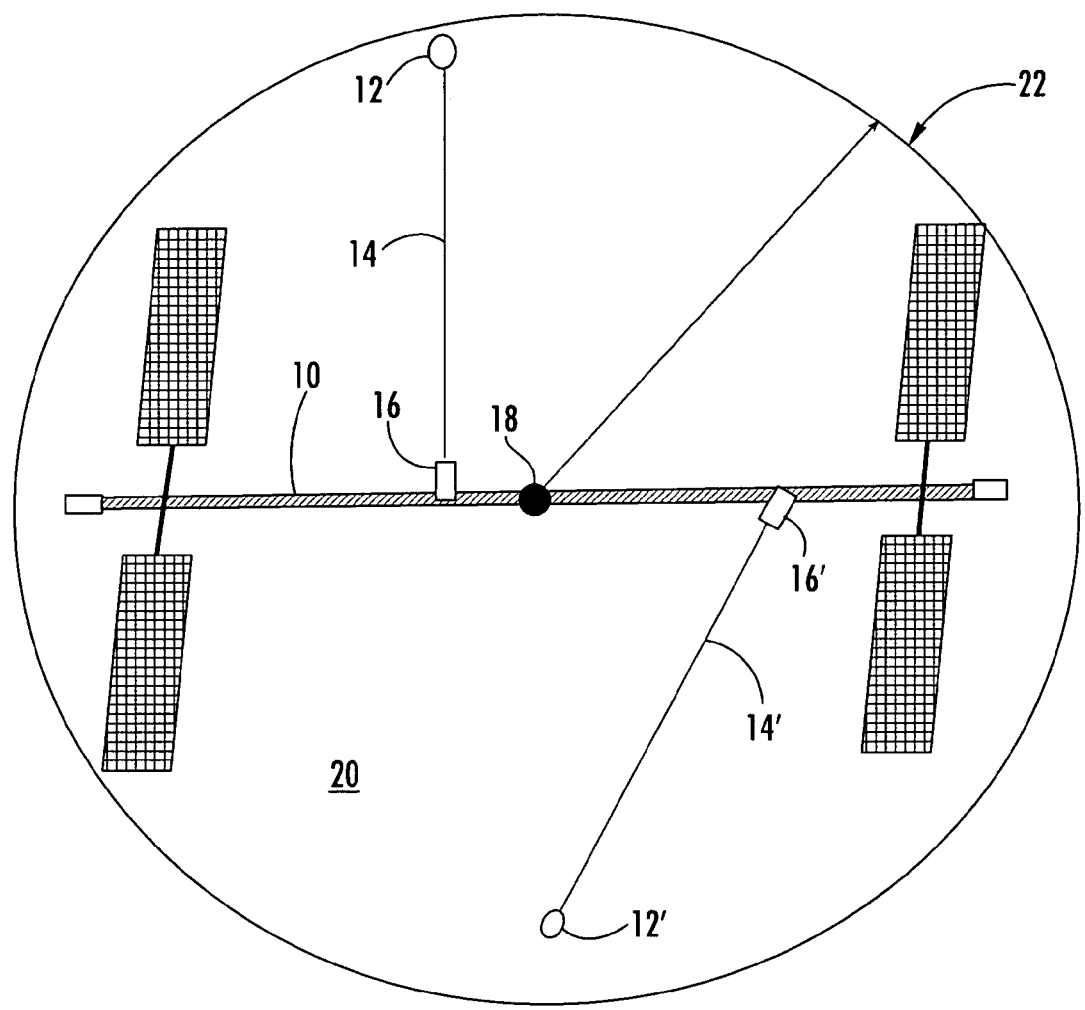
Figure 2:
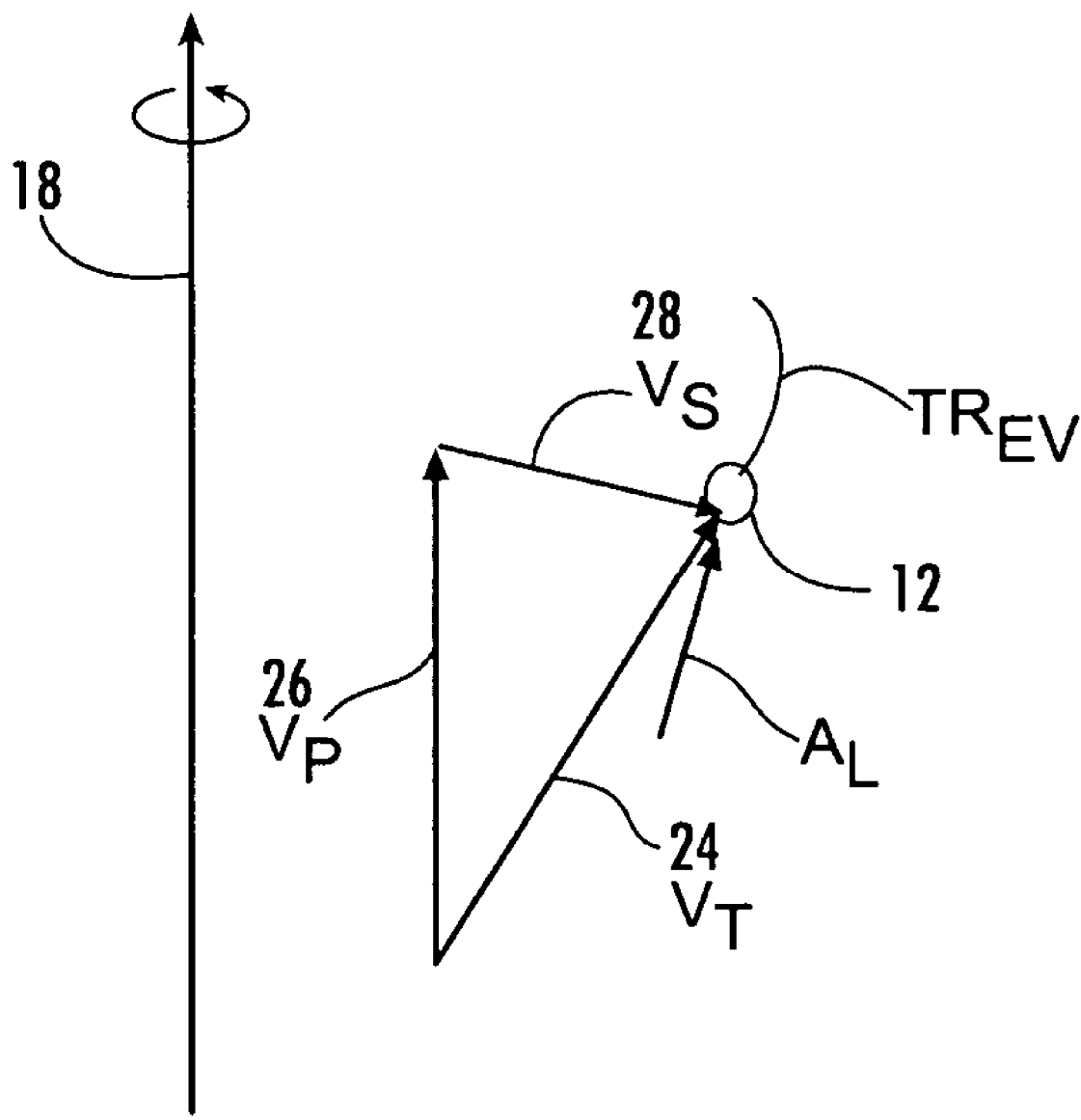
Figure 3:
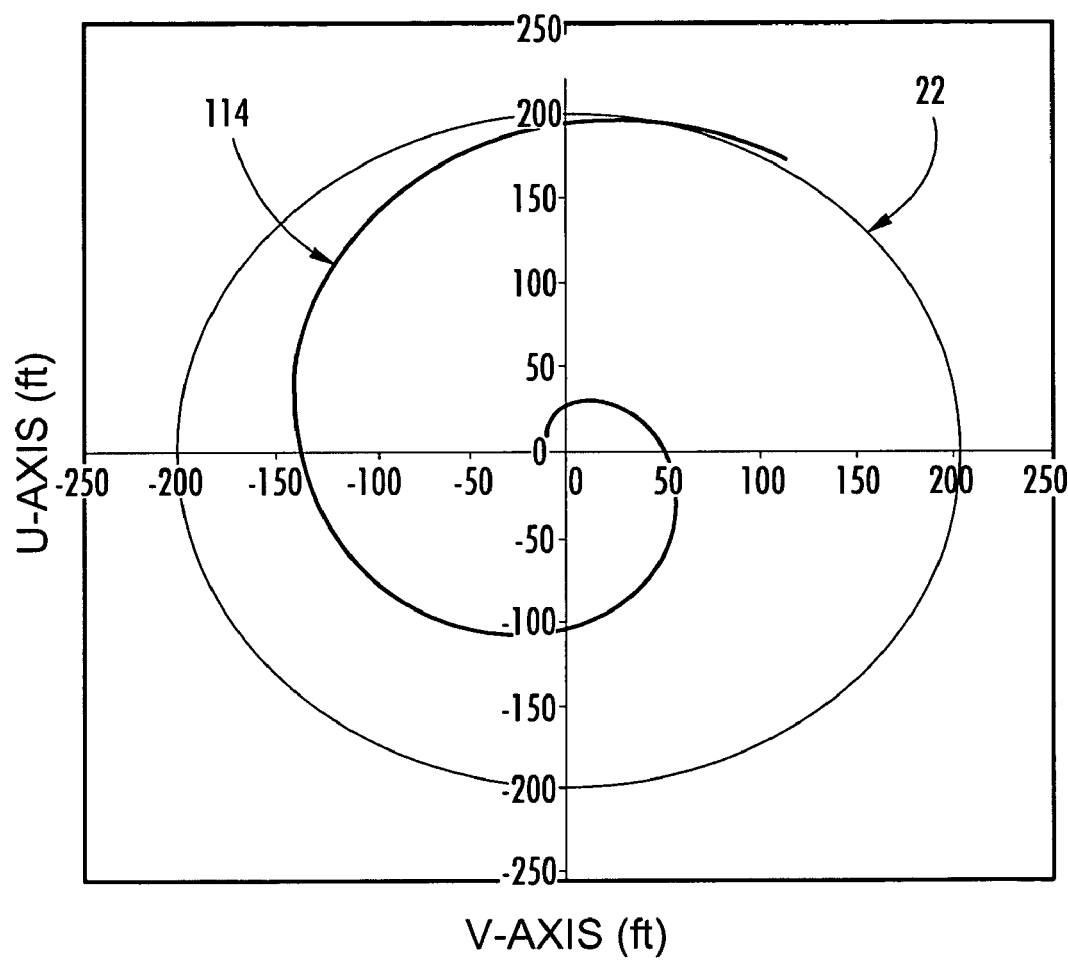
Figure 4:
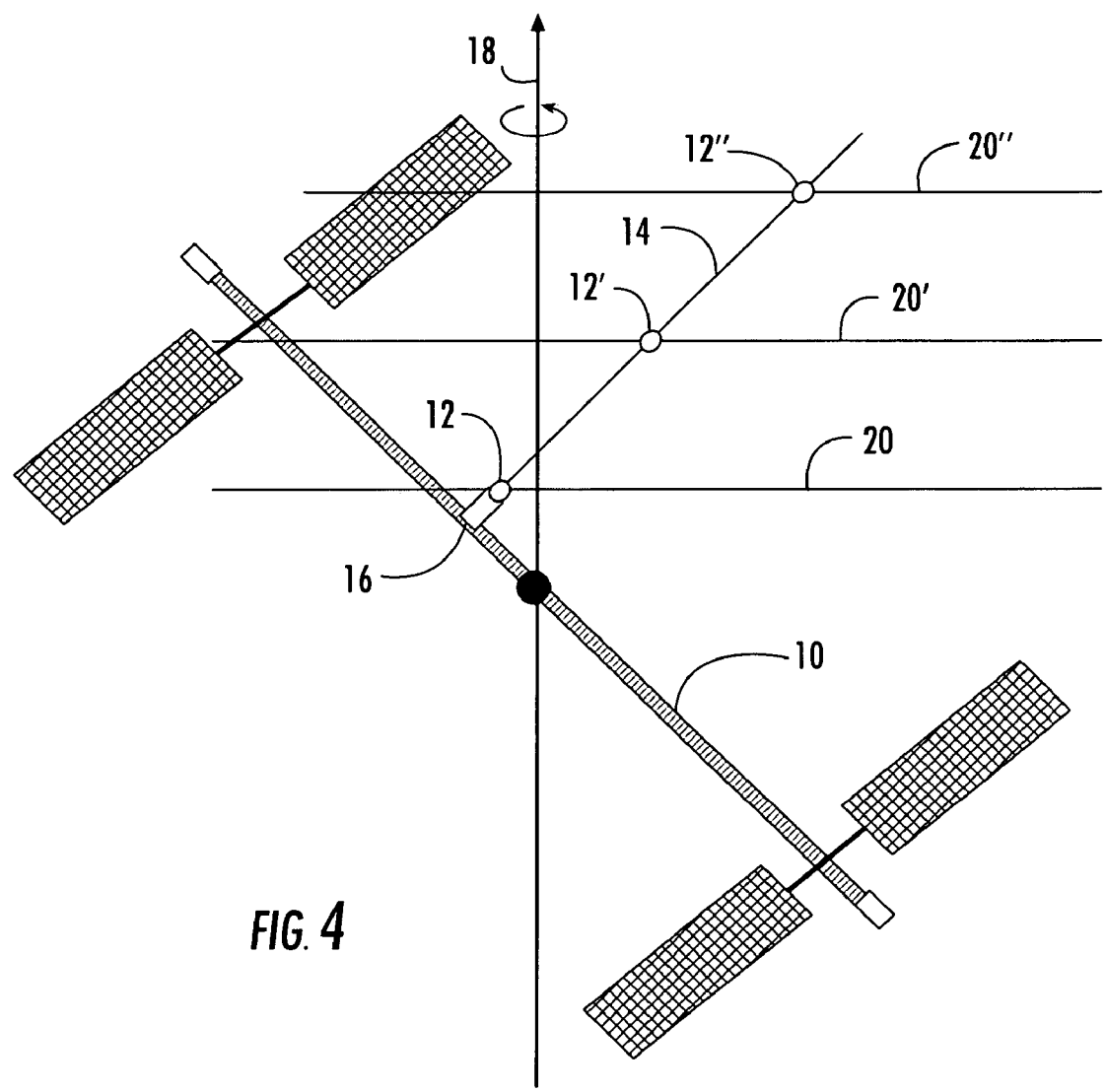
Figure 5:
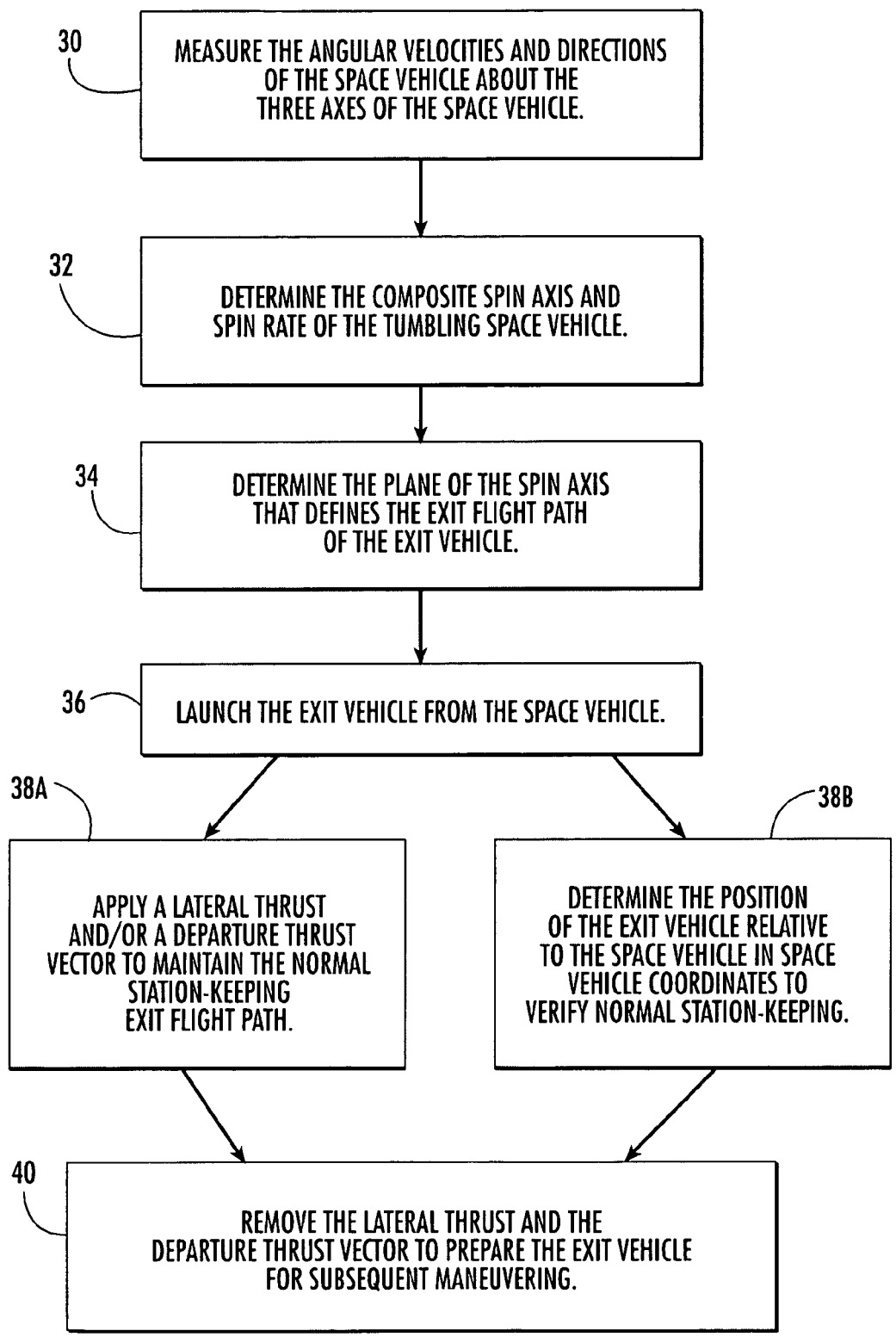

Having thus described the invention in general terms, reference will now be made to the accompanying drawings, which are not necessarily drawn to scale, and wherein:

FIG. 1 is an elevational representative view of a rotating space station and two alternative exit flight paths in accordance with one embodiment of the present invention, wherein each exit vehicle flight path is projected into a spin axis plane that is perpendicular to the composite spin axis, in space station coordinates, and wherein the largest exit radius is shown;

FIG. 2 is a diagrammatic view of one departing exit vehicle of FIG. 1, illustrating the $V_S$ component of the departure velocity of the exit vehicle in the spin axis plane and illustrating the lateral acceleration $A_L$ that turns the exit vehicle $V_S$ component for the departing exit vehicle;

FIG. 3 is a graph charting the exit flight path of an exit vehicle in inertial coordinates, determined in accordance with one embodiment of the present invention, wherein the exit vehicle is departing from a space station rotating at 2 degrees per second, and wherein the largest radius of the rotating space station of FIG. 1 is shown;

FIG. 4 is a side view of the rotating space station of FIG. 1, illustrating three spin axis planes perpendicular to the composite spin axis of the rotating space station; and FIG. 5 is a flow chart illustrating steps to maintain the normal station-keeping exit flight path during the departure of an exit vehicle from a rotating space vehicle according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–5, the departure of an exit vehicle from a rotating space station in accordance with one embodiment of the methods, apparatus, and computer program products of the present invention is illustrated. The present invention ensures safe and reliable departure from a dimensionally extended space vehicle that is spinning about one or more axes. Whereas any dimensionally extended rotating space vehicle may use the methods, apparatus, and computer program products of the present invention, space stations such as the ISS are presently the most common space vehicle in which an exit vehicle is provided. Therefore, the embodiments of the present invention described herein relate to rotating space stations; however, the present invention may be used with any dimensionally extended rotating space vehicle.

Space stations preferably have a static orientation during normal operation and thus do not spin; however, situations may occur that cause the space station 10 to rotate about one or more of its three axis, similar to the representation in FIG. 1. In situations where the space station 10 is rotating, the exit flight path of the exit vehicle 12 must be different than the exit flight path from a static space station to prevent contact between the exit vehicle and the rotating space station. The methods, apparatus, and computer program products of one embodiment of the present invention advantageously provide normal station-keeping along the exit flight path 14 of the exit vehicle 12 when the space station 10 is rotating.

Normal station-keeping, which is also described as progressive station-keeping along the exit flight path, generally provides the same exit flight path 14, relative to the space station, for an exit vehicle 12 departing from a rotating space station 10 as the exit flight path for an exit vehicle departing from the space station if it were static. Movement of the exit vehicle 12 relative to the space station 10 is described using space station coordinates, while the actual movement of the exit vehicle is described using inertial coordinates. Further embodiments of the present invention, wherein the dimensionally extended rotating space vehicle is not a space station, define space vehicle coordinates that are analogous to the space station coordinates described herein. It should be noted that for an exit flight path from a static space station, the space station coordinates and the inertial coordinates of the exit flight path would be generally equivalent; however, for a rotating space station, the two coordinate systems will differ. FIG. 1 illustrates the normal station-keeping exit flight path 14 of the exit vehicle 12 from a rotating space station 10 in space station coordinates, while FIG. 3 illustrates the actual exit flight path 114 of the exit vehicle from a rotating space station in inertial coordinates.

To depart from a static or rotating space station 10, the crew enters the exit vehicle 12 and seals the exit vehicle. The exit vehicle 12 is attached to or located within a port 16, illustrated in FIG. 1, joined to the space station 10. An exit vehicle 12 launched from a port 16 at any location or orientation relative to the space station 10 suitable for departure from a static space station may use the present invention to provide a normal station-keeping exit flight path 14 from a rotating space station. FIG. 1 illustrates two ports 16 and 16' for the launching of the exit vehicle 12. The exit vehicle 12 of FIG. 1 is launched from the port 16 in a direction that is generally perpendicular to the space station's longitudinal axis, and the exit vehicle 12' also of FIG. 1 is launched from port 16' in a direction that is generally angled, or canted, relative to the space station's longitudinal axis. The longitudinal axis of the illustrated space station 10 is generally the axis of the space station defined along the longest portion of the space station of FIG. 1; however, it should be appreciated that the ports of alternative space stations may be oriented at any angle relative to any axis. Once the exit vehicle 12 or 12' is ready to be launched, a launch mechanism initiates departure and provides the exit vehicle with a departure velocity in a direction of the exit flight path 14 or 14', as described more fully below. Advantageously, the exit vehicle 12 or 12' is launched so as to have a linear exit trajectory in space station coordinates in the direction of the departure velocity. Furthermore, the exit vehicle 12 or 12' is launched to have an exit trajectory defining a constant departure velocity or an accelerating departure velocity.

Referring again to FIG. 1, a rotating space station 10 is shown in a projected elevational view, wherein the space station is rotating around a composite spin axis 18 (perpendicular to the page) in a plane 20 of the spin axis. The composite spin axis 18 and the spin axis plane 20 are determined by the methods, apparatus, and computer program products of the present invention to maneuver the exit vehicle 12 along a generally normal station-keeping exit flight path 14 in one embodiment of the present invention. FIG. 1 is a projected elevational view of the space station 10 in a spin axis plane 20 along the composite spin axis 18. This view provides a representation of the largest exit radius 22, which is defined as the path of an extremity of the rotating space station that is furthest from the space station center of gravity. In FIG. 1, the outermost corner of a solar panel defines the largest exit radius 22. The largest exit radius 22 defines the position beyond which the exit vehicle 12 is not able to contact the space station 10, at which point the exit flight path 14 is essentially complete and the exit vehicle is able to adjust its flight path as needed for subsequent maneuvering. The fundamental features of the maneuver of various embodiments of the present invention are described as Keeping In Normal Station-keeping To Largest Exit Radius, which is also known as the KINSTLER maneuver.

The space station 10 of FIG. 1 is rotating about one or more of its three axes, and the angular velocities and directions along the three axes are measured to determine the composite spin axis 18. Prior to, or concurrent with, the launch of the exit vehicle 12 from the space station 10, measurements relating to the spinning of the rotating space station must be made. These measurements are subsequently used to determine the spin characteristics of the space station 10, which comprise the composite spin axis, the spin rate of the space station, and the planes of the spin axis, all of which are used in the methods, apparatus, and computer program products of the present invention. The exit vehicle 12 advantageously comprises at least one 3-axis gyroscope, or similar instrument, to sense the angular velocities and directions of the spinning along the three axes. Exit vehicles often comprise two or more gyroscopes for redundant measurements and for situations where one or more gyroscopes are disabled. Alternatively, the space station 10 comprises the 3-axis gyroscope in further embodiments of the present invention. Still further embodiments of the present invention comprise alternative measurement devices in the exit vehicle and/or space station for measuring the angular velocities and directions of the spinning along the axes of the rotating space station.

A 3-axis gyroscope measures the angular velocities and directions of the spinning of the space station about each of the three axes. Two non-limiting examples of 3-axis gyroscopes are a ring laser gyroscope and a fiber optic gyroscope, which are known in the art. The signals produced by the at least one gyroscope are processed to determine the angular velocity and direction of the spinning of the space station about each axis. These discrete measurements are used to determine the composite spin axis 18 of the rotating space station 10 and determine the spin rate of the space station. One embodiment of the present invention determines the composite spin axis 18 of the space station 10 by determining the root-sum-square (RSS) of the spin of the space station about all three axes. The RSS is the square root of the sum of the squares of each angular velocity in each of the three axes, which is effectively a vector summation. The RSS results in a single angular velocity about a single axis for the rotating space station. The single axis defines the composite spin axis 18, and the single angular velocity defines the spin rate of the rotating space station about the composite spin axis. Alternative methods of measuring the angular velocities and directions of the spinning of the rotating space vehicle about each of the three axes and determining the composite spin axis and spin rate from the resulting measurements are comprised in further embodiments of the present invention. Generally, the three mutually perpendicular attitudinal axes are oriented along the space station's longitudinal axis and two other axes that a mutually perpendicular to each other and to the station's longitudinal axis. It should be noted that when angular rates are present in more than one of these attitudinal directions, gyrating and nutating movements of apparently complex nature are manifested.

Once the composite spin axis 18 of the rotating space station 10 has been determined, a plurality of spin axis planes, such as the three spin axis planes 20, 20', and 20" of FIG. 4, that are perpendicular to the composite spin axis and that pass through the exit vehicle 12 are defined. Accordingly, the exit flight path of the exit vehicle 12 is defined in the plurality of spin axis planes. As shown in FIG. 4, the exit vehicle is defined along the three illustrated spin axis planes 20, 20', and 20" of the plurality of spin axis planes during execution of the KINSTLER maneuver, wherein the spin axis planes sequentially advance along the composite spin axis 18 as the KINSTLER maneuver is carried out. A spin axis plane is defined to be that single unique plane at any point in time that passes through the exit vehicle and is perpendicular to the composite spin axis. By maintaining the normal station-keeping in the spin axis planes 20, 20', and 20", even though the spin axis planes axially shift, the KINSTLER maneuver ensures that the exit vehicle 12 does not contact the space station along the exit flight path just as the exit vehicle would not contact the space station along the exit flight path if the space station were static. In other words, by defining the spinning of the rotating space station 10 as being effectively about the composite spin axis 18, the space station is considered static in an axial direction along the axis of the composite spin axis for normal station-keeping purposes. Therefore, the present invention maintains the normal station-keeping exit flight path 14 of the exit vehicle 12 along the spin axis planes 20, 20', and 20", even though the spin axis planes containing the exit vehicle 12 effectively move axially along the composite axis 18 during the exit flight path of the exit vehicle.

Prior to or concurrent with the launch of the exit vehicle 12 from the port 16, the composite spin axis 18 of the space station and the spin rate of the space station, as well as the path of the normal station-keeping exit flight path 14 relative to the composite spin axis are determined. Thus, the initial plane 20 of the spin axis perpendicular to the composite spin axis 18 is defined. The exit vehicle 12 is launched from the port 16 with a launch mechanism that provides a departure velocity to the exit vehicle relative to the space station in space station coordinates. Preferably, the departure velocity is approximately 1 ft/sec, or more preferably approximately 3 ft/sec; however, any departure velocity may be provided to the exit vehicle. The departure velocity carries the exit vehicle outward from the space station toward the exit radius.

The launch mechanism is advantageously a compressed spring loaded during the docking or attachment of the exit vehicle such that when the exit vehicle is detached the spring provides an initial acceleration that creates the departure velocity. Detachment of the exit vehicle occurs by any method known in the art, one non-limiting example being the actuation of a mechanical linkage. Alternative launch mechanisms, such as magnetic devices to list a non-limiting example, known in the art may also be used with the present invention. Pyrotechnic push-off mechanisms such as exploding bolts or thrusters may be used as launch mechanisms; however, such pyrotechnic devices must be carefully used to prevent unintentional damage to the exit vehicle and/or space station. Once the exit vehicle 12 has been launched from the space station 10, a thruster device, such as the thrusters on the exit vehicle, which are explained more fully below, may be used to increase the departure velocity during the departure of the exit vehicle. If no additional acceleration is provided to the exit vehicle in the direction of the departure velocity, then the departure velocity remains generally constant during the departure.

Referring to FIG. 2, the total resultant instantaneous velocity vector ($V_T$) 24 of the exit vehicle 12 is comprised of the initial departure velocity plus any additional contributions provided by accelerating forces of the exit vehicle engine thrusters applied to change the instantaneous velocity vector's magnitude or direction. Further, the instantaneous velocity vector $V_T$ is advantageously resolved into two components, a perpendicular velocity component ($V_P$) 26 perpendicular to the planes 20, 20', and 20" of the spin axis 18 and a parallel velocity component ($V_S$) 28 parallel to the spin axis planes 20, 20', and 20". The $V_S$ component of the departure velocity is generally defined in the plurality of spin axis planes.

To prevent the launched exit vehicle from contacting the rotating space station, the present invention provides a lateral acceleration to cause the exit vehicle's $V_S$ component 28 to turn proportionately with the spinning of the space station. The turn rate of the exit vehicle's $V_S$ component 28 provides the turn rate of the exit vehicle 12 so that the exit vehicle turns proportionately with the rotating space station 10. The lateral acceleration $A_L$, which is illustrated in FIG. 2, is advantageously provided by a lateral thrust generally orthogonal to the exit vehicle's $V_S$ component 28 in the spin axis plane. The lateral acceleration $A_L$ provides a turn rate of the exit vehicle's $V_S$ component 28 that is proportionate to the spin rate of the rotating space station 10. The turn rate $TR_{EV}$ of the exit vehicle, which is illustrated in FIG. 2, is a combination of the departure velocity $V_D$ and the lateral velocity created by the lateral acceleration $A_L$. The turn rate $TR_{EV}$ in degrees per second is equal to the lateral acceleration divided by the exit vehicle's $V_S$ component 28 in the spin axis plane, or $TR_{EV}=[A_L/V_S]*57.3$. A constant of approximately 57.3 is used to convert radians into degrees so that the turn rate $TR_{EV}$ is in degrees per second (deg/sec). Advantageously, the turn rate of the exit vehicle is equal to the spin rate of the space station in one embodiment of the present invention. By providing a turn rate of the exit vehicle that is equal to the spin rate of the space station, the normal station-keeping exit flight path can be maintained such that the exit vehicle departs from the space station generally along the same exit flight path, in space station coordinates, when the space station is rotating as it would depart from a static space station when no lateral thrust were applied.

FIG. 3 illustrates the exit flight path 114 of an exit vehicle when the spin rate of the space station is 2 deg/sec and the turn rate of the exit vehicle is 2 deg/sec. When the turn rate of the exit vehicle's $V_S$ component 28 and the spin rate of the space station are equal, the exit vehicle turns in synchronization with the rotating space station. Further embodiments of the present invention provide a lateral acceleration $A_L$ that creates a turn rate of the exit vehicle's $V_S$ component 28 that is proportionate to the spin rate of the space station but is faster than the spin rate of the space station or is slower than the spin rate of the space station. Thus, it should be noted that proportionality between the turn rate and spin rate includes proportional relationships wherein the turn rate of the exit vehicle's $V_S$ component 28 is not equal to the spin rate of the space station. In situations where the turn rate and spin rate are not equal, the turn rate of the exit vehicle is correlated to the spin rate of the space station by an amount sufficient to prevent contact between the exit vehicle and the space station to define the proportional relationship. Caution must be exercised when the turn rate of the exit vehicle's $V_S$ component 28 and the spin rate of the space station are not equal because the exit flight path will not be the normal station-keeping exit flight path, and thus the exit vehicle is more likely to contact the rotating space station if the turn rate of the exit vehicle is not carefully controlled.

The lateral thrust is advantageously provided by a thruster device, such as at least one thruster on the exterior of the exit vehicle. Exit vehicles and other spacecraft typically include two sets of thrusters: Orbital Maneuvering Systems (OMS) thrusters for large changes in velocity of the exit vehicle, also called large $\Delta V$ maneuvers, and Reaction Control System (RCS) thrusters for smaller changes in velocity or attitude changes. The OMS thrusters often provide 10 to 100 times more thrust than the RCS thrusters. For the illustrated embodiment of the present invention, RCS thrusters are typically used to provide the lateral thrust to the exit vehicle during the departure of the exit vehicle along the exit flight path. Further embodiments of the present invention use any type or number of thrusters or alternatively use any type of thruster device known in the art to apply a lateral thrust.

Advantageously, the lateral thrust is applied after the exit vehicle has launched from the port. The amount of lateral thrust applied may be constant during the exit flight path of the exit vehicle or may increase and/or decrease during the exit flight path. To maintain the normal station-keeping exit flight path during departure of the exit vehicle, the duty cycle of the at least one lateral thruster device is determined so that the turn rate of the exit vehicle is proportionate to the spin rate of the space station. Advantageously, the duty cycle is determined mathematically by processing circuitry; however, the duty cycle may be determined by alternative methods. The duty cycle ($DC_L$) is the ratio of the lateral acceleration ($A_L$) required for the turn rate of the exit vehicle's $V_S$ component 28 to equal the spin rate of the space station divided by the thruster acceleration ($A_T$) available at 100% full duty cycle. Therefore, the equation for the duty cycle is represented as $DC_L=A_L/A_T$. The lateral acceleration required for the turn rate of the exit vehicle's $V_S$ component 28 to equal the spin rate of the space station is represented as $A_L=[\text{spin rate}/57.3]*V_S$. The spin rate is divided by 57.3 to convert the deg/sec into radians per second, and $V_S$ is the velocity of the exit vehicle's $V_S$ component. In the embodiments of the present invention wherein the turn rate of the exit vehicle's $V_S$ component 28 is faster or slower than the spin rate of the space station, the preceding equation is modified to increase or decrease the relationship between the turn rate and the spin rate so that the turn rate remains proportionate to the spin rate. The thruster acceleration $A_T$ is represented by the following equation: $A_T=[\text{maximum thrust/exit vehicle weight}]*32.2$. The constant of approximately 32.2 is a conversion factor for the relationship between lb-force and lb-mass. An example of a maximum thrust from the lateral thruster is 100 lb-force, and an example of an exit vehicle weight is 32,200 lb-mass. Among other things, the exit vehicle weight includes the vehicle itself, the crew and their supplies, and propellant, which can be approximately 3,000 lb-mass in some embodiments of an exit vehicle. Alternative values for the given variables are used in further embodiments of the present invention, and still further embodiments of the present invention use alternative mathematical relationships to determine the amount of lateral thrust required to create the proportionate relationship between the turn rate of the exit vehicle's $V_S$ component 28 to the spin rate of the space station.

Advantageously, the duty cycle of the lateral thruster increases to maintain the turn rate of the exit vehicle's $V_S$ component 28 proportionate to the spin rate of the space station. This will typically occur as the exit vehicle's $V_S$ component 28 increases in magnitude as the exit trajectory proceeds toward the largest exit radius 22 and the exit vehicle follows the exit trajectory in accordance with equations for $TR_{EV}$, $A_L$, and $DC_L$ provided above. Additionally, if the normal station-keeping exit flight path of the KINSTLER maneuver includes an increasing departure velocity, such that a thruster device applies a departure acceleration in the direction of the departure velocity, such that $V_T$ increases and its component in the spin axis plane $V_S$ 28 increases, similar increases in the duty cycle of the lateral thruster would be necessary to maintain the proportionate relationship between the turn rate of the exit vehicle's $V_S$ component 28 and the spin rate of the space station. Advantageously, the departure acceleration should be limited so that the lateral thruster device is not required to exceed the available duty cycle of the thrusters used to provide a turn rate equal to the spin rate as described below; otherwise, the lateral thruster device will not be able to maintain normal station-keeping during the exit flight path, which may lead to contact between the exit vehicle and space station. Further embodiments of the present invention provide lateral acceleration and departure acceleration by alternative methods or with alternative relative relationships.

It should be noted that as the exit vehicle's $V_S$ component 28 increases as the exit vehicle approaches the largest exit radius, the direction of the $V_S$ component becomes increasingly tangential to the spinning space station such that the thrust being applied to the exit vehicle is increasingly in the direction of the composite spin axis 18 (in the centripetal force direction).

FIG. 3 is a graph illustrating the exit flight path of an exit vehicle in inertial coordinates. The largest exit radius 22 of FIG. 1 is illustrated in FIG. 3 as defining a radius of approximately 200 feet, and the exit flight path 114 of the exit vehicle is also shown. The composite spin axis is located at the (0,0) coordinate of the V- and U-axes. The V-axis and the U-axis define all the spin axis planes of the illustrated embodiment of the present invention during the complete KINSTLER maneuver of the illustrated embodiment. FIG. 3 represents an exit flight path 114 for an exit vehicle with no departure acceleration and a constant departure velocity of 1 ft/sec for the scenario where the departure velocity is 100% in the spin axis plane of the composite spin axis such that exit vehicle's $V_S$ component 28 is also 1 ft/sec. The space station has a spin rate of 2 deg/sec. Therefore, the turn rate $TR_{EV}$ of the exit vehicle should be 2 deg/sec to maintain the normal station-keeping exit flight path; thus, a lateral acceleration $A_L$ of 0.035 ft/sec² is required for a $TR_{EV}$ of 2 deg/sec at the beginning of the KINSTLER maneuver. If the thruster device provides a 100 lb-force lateral thrust at 100% duty cycle and the weight of the exit vehicle is 32,200 lb-mass, then the thruster acceleration $A_T$ is 0.1 ft/sec². Therefore, the required duty cycle $DC_L$ to maintain the normal station-keeping exit flight path at the beginning of the KINSTLER maneuver is 35%. As the exit trajectory reaches the largest exit radius 22 the tangential velocity builds up to approximately 7.0 ft/sec. When the tangential velocity component is combined with the initial departure velocity of 1.0 ft/sec in the radial direction from the composite spin axis 18, the magnitude of the total velocity vector $V_T$ 24 is 7.07 ft/sec and its direction is generally orthogonal, at 82 degrees, with respect to the departure velocity direction. The duty cycle at the largest exit radius has risen to approximately 2.45. This requires the equivalent of 2.45 of the 100 lb-force thrusters directed in the necessary direction. This is accomplished with four 100 lb-force thrusters as follows. Two thrusters acting at 90 degrees to each other at 100% thrust produce the equivalent of 1.414 100 lb-force thrust duty cycle in the direction midway (45 degrees) between each of the thruster's directions. Adding another thruster pair in a similar manner on the opposite side of an exit vehicle to achieve a balanced (non-torquing) thrust arrangement provides an additional 1.414 duty cycle, providing in combination a total of 2.82 total available duty cycle, enough to deliver the KINSTLER maneuver's required maximum of 2.45.

The duration of the exit flight path of the exit vehicle is approximately 200 seconds from the moment it is launched to the moment it passes beyond the largest exit radius of the rotating space station. As shown in FIG. 3, the exit vehicle makes an entire revolution about the composite spin axis in inertial coordinates before the exit vehicle passes beyond the largest exit radius 22.

The lateral thrust and departure thrust are advantageously provided by thruster devices that consume propellant. Advantageously, the propellant of the illustrated embodiment is rocket fuel; however, further embodiments of the present invention consume alternative propellants. Still further embodiments of the present invention provide the thrusts by alternative methods that may or may not consume propellant. Because the exit vehicle contains only a limited amount of propellant, the thruster devices preferably use a minimal amount of propellant to preserve propellant for maneuvering of the exit vehicle subsequent to departing from the largest exit radius of the space station. For the exit flight path illustrated in FIG. 3, the lateral thruster device requires duty cycles from 35% to 245% for 200 seconds during the departure of the exit vehicle. The 100 lb-force thruster of one embodiment of the present invention consumes 0.33 lb-mass per second of use at 100% duty cycle; therefore, lateral thrusting with duty cycles ranging from 35% to 245% to the largest exit radius consumes approximately 104 pounds of fuel to accomplish the KINSTLER maneuver. For an exit vehicle containing 3,000 lb-mass of propellant, the KINSTLER maneuver of the described embodiment of the present invention consumes approximately 3% of the propellant supply, which advantageously preserves the remainder of the propellant for subsequent maneuvering. Alternatively, the departure velocity may be increased to shorten the exit time and to reduce the resultant amount of fuel required to implement the KINSTLER maneuver.

As the exit vehicle departs the space station along the exit flight path, the position of the exit vehicle, in space station coordinates, is advantageously determined to ensure that the exit vehicle maintains the normal station-keeping exit path during departure. Such positioning is advantageously calculated as a distance in the spin axis plane as a function of time using kinematics equations known in the art. This positioning of the exit vehicle relative to the composite spin axis, wherein the orientation of the space station relative to the composite spin axis is known, desirably provides verification that the exit vehicle is maintaining the normal station-keeping exit flight path and will not contact the space station. If the exit vehicle begins to deviate from the normal station-keeping exit flight path, the amount of thrust provided by a thruster device, such as the lateral thruster or departure thruster, can be adjusted in real time to correct the flight path and return to normal station-keeping. Further embodiments of the present invention use alternative methods of determining the position of the exit vehicle relative to the space station in space station coordinates to verify normal station-keeping; non-limiting examples include the use of proximity sensors, radar devices, positioning systems, or the like. Still further embodiments of the present invention do not determine the position of the exit vehicle along the exit flight path.

FIG. 5 is a flow chart illustrating steps 30 through 40 for maintaining the normal station-keeping exit flight path during the departure of an exit vehicle from a dimensionally extended rotating space vehicle, such as a rotating space station, according to one embodiment of the present invention. Step 30 comprises measuring the angular velocities and directions of the space vehicle about the three axes of the space vehicle with a measuring device such as a 3-axis gyroscope or the like. Step 32 comprises using the measurements to determine the composite spin axis and spin rate of the space vehicle. Furthermore, step 34 comprises determining the planes of the spin axis that define the exit flight path of the exit vehicle. Step 36 comprises launching the exit vehicle from the space vehicle such that a departure velocity is provided for the exit vehicle. Step 38A comprises applying a lateral thrust and/or a departure thrust during the departure of the exit vehicle to maintain the normal station-keeping exit flight path, and step 38B comprises determining the position of the exit vehicle relative to the space vehicle in space vehicle coordinates to verify normal station-keeping. Steps 38A and 38B are advantageously performed concurrently in the event that real time adjustment of the exit flight path of the exit vehicle is required. Finally, step 40 is provided to remove the lateral thrust and/or the departure thrust vector to prepare the exit vehicle for subsequent maneuvering. Further embodiments of the present invention comprise additional steps, fewer steps, and/or alternative steps to provide a safe and reliable exit flight path for an exit vehicle.

It should be noted that situations may arise, particularly in emergencies, wherein the dimensionally extended rotating space vehicle rotates at angular velocities that are not constant. The methods, apparatus, and computer program products of the present invention are also be used when a space vehicle is rotating at an increasing or decreasing angular velocity, as opposed to the constant angular velocities discussed herein. In such a situation, the measurements reflect the changing angular velocities and directions, and the determinations of the composite spin axis, spin rate, and spin axis plane are adjusted accordingly, so that the exit vehicle is able to maintain the normal station-keeping exit flight path and not contact the space vehicle.

The measurements, determinations, calculations, and other actions provided by the present invention are advantageously performed by an apparatus with processing circuitry, such as a processor or other computing device. Such processor or other computing device advantageously actuates the launching mechanism to launch the exit vehicle and actuates the thruster devices to provide the lateral thrust and departure thrust. The various methods of the present invention are generally implemented by a computer program product that may direct the operation of a processing circuitry. This computer program product includes a computer-readable storage medium, such as a non-volatile storage medium, and computer-readable program code portions, such as a series of computer instructions, embodied in the computer-readable storage medium. Further implementations of the present invention may be performed by alternative devices.

It will be understood that each step 30 to 40 of the flowchart can be implemented by or with computer program instructions. These computer program instructions may be loaded onto processing circuitry, such as on a computer or other programmable apparatus to perform the functions of the present invention, such that the instructions which execute on the computer or other programmable apparatus create means for implementing the functions specified in the flowchart blocks or steps. These computer program instructions may also be stored in a computer-readable memory that can direct a computer or other programmable apparatus to function in a particular manner, such that the instructions stored in the computer-readable memory perform the measurements, determinations, and actions illustrated in the flowchart blocks or steps. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart blocks or steps.

Accordingly, blocks or steps of the flowchart of FIG. 5 support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for maneuvering an exit vehicle departing from a rotating non-terrestrial space vehicle, the apparatus comprising:

processing circuitry, carried by the exit vehicle, for: (i) determining a composite spin axis of the rotating non-terrestrial space vehicle to define a plurality of spin axis planes that are perpendicular to the composite spin axis, wherein an exit flight path of the exit vehicle is defined in the plurality of spin axis planes; and (ii) determining a spin rate of the rotating non-terrestrial space vehicle about the composite spin axis;

launch mechanism for: (iii) launching the exit vehicle from the rotating non-terrestrial space vehicle with a departure velocity, wherein the departure velocity includes a $V_S$ component defined in the plurality of spin axis planes; and thruster device for: (iv) applying a lateral thrust to the exit vehicle that is generally orthogonal to the $V_S$ component of departure velocity to provide a lateral acceleration, wherein the lateral acceleration is defined in the spin axis plane, and wherein the lateral acceleration provides a turn rate of the exit vehicle's $V_S$ component in the spin axis plane about the composite spin axis that is proportionate to the spin rate of the rotating non-terrestrial space vehicle.

2. An apparatus according to claim 1 wherein the processing circuitry determines a root-sum-square of angular velocities of the rotating non-terrestrial space vehicle about all three space vehicle axes to determine the composite spin axis of the rotating non-terrestrial space vehicle.

3. An apparatus according to claim 1 wherein the launch mechanism provides a departure velocity that remains constant along the exit flight path.

4. An apparatus according to claim 1 further comprising a thruster device for increasing the departure velocity along the exit flight path.

5. An apparatus according to claim 1 wherein the rotating non-terrestrial space vehicle comprises a station and wherein the launch mechanism provides a generally linear exit trajectory in relation to the space station, in a direction of the departure velocity when launching the exit vehicle.

6. An apparatus according to claim 1 wherein the thruster device applies the lateral thrust to provide a turn rate of the exit vehicle's $V_S$ component in the spin axis plane that is proportionate to the spin rate of the rotating non-terrestrial space vehicle such that the turn rate is equal to the spin rate of rotating non-terrestrial space vehicle, such that the exit vehicle turns in synchronization with the rotating non-terrestrial space vehicle.

7. An apparatus according to claim 1 wherein the thruster device applies the lateral thrust to provide a turn rate of the exit vehicle's $V_S$ component in the spin axis plane that is faster than the spin rate of the rotating non-terrestrial space vehicle.

8. An apparatus according to claim 1 wherein the thruster device applies the lateral thrust to provide a turn rate of the exit vehicle's $V_S$ component in the spin axis plane that is slower than the spin rate of the rotating non-terrestrial space vehicle.

* * * * *

UNITED STATES PATENT AND TRADEMARK OFFICE
CERTIFICATE OF CORRECTION

PATENT NO. : 7,114,684 B2  Page 1 of 1
APPLICATION NO. : 10/802021
DATED : October 3, 2006
INVENTOR(S) : Kinstler It is certified that error appears in the above-identified patent and that said Letters Patent is hereby corrected as shown below:

Column 13,
Line 5, "comprises a station" should read --comprises a space station--.

Signed and Sealed this

Sixth Day of March, 2007

JON W. DUDAS
*Director of the United States Patent and Trademark Office*